(12) United States Patent
Bretschneider et al.

(10) Patent No.: US 6,540,462 B1
(45) Date of Patent: Apr. 1, 2003

(54) SCREW CONNECTION

(75) Inventors: Bernd Bretschneider, Bad Laasphe (DE); Heinrich Friederich, Gross-Rohrheim (DE); Reinhard Schmoock, Netphen (DE)

(73) Assignee: EJOT Verbindungstechnik GmbH & Co., Bad Laasphe (DE)

( * ) Notice: Subject to any disclaimer, the term of this patent is extended or adjusted under 35 U.S.C. 154(b) by 0 days.

(21) Appl. No.: 09/831,854

(22) PCT Filed: Jul. 13, 2000

(86) PCT No.: PCT/EP00/06667

§ 371 (c)(1),
(2), (4) Date: Jul. 19, 2001

(87) PCT Pub. No.: WO01/20176

PCT Pub. Date: Mar. 22, 2001

(30) Foreign Application Priority Data

Sep. 16, 1999 (DE) .......................... 199 44 589

(51) Int. Cl.[7] .............................................. F16B 39/02
(52) U.S. Cl. ........................................ 411/82; 411/301
(58) Field of Search ................... 411/82, 301, 180, 411/181, 183, 80.1–80.6

(56) References Cited

U.S. PATENT DOCUMENTS

| | | | | |
|---|---|---|---|---|
| 991,517 A | * | 5/1911 | Kennedy | |
| 1,107,544 A | * | 8/1914 | Ogden | |
| 2,167,558 A | | 7/1939 | Upson | |
| 2,544,304 A | * | 3/1951 | Eckenbeck | |
| 3,030,997 A | * | 4/1962 | Collins | |
| 3,129,444 A | * | 4/1964 | Kahn | |
| 3,145,751 A | * | 8/1964 | Boots | |
| 3,221,790 A | * | 12/1965 | Poupitch | |
| 3,280,875 A | * | 10/1966 | Fischer | |
| 3,434,521 A | * | 3/1969 | Flora | |
| 3,771,272 A | * | 11/1973 | Mihaly | |
| 4,341,053 A | * | 7/1982 | Dettfurth | |
| 4,750,851 A | * | 6/1988 | Thomey | |
| 4,974,549 A | * | 12/1990 | Gordon | |
| 5,082,405 A | * | 1/1992 | Witten | |
| 5,122,196 A | * | 6/1992 | Fernandez | |
| 5,201,624 A | * | 4/1993 | Ecktman | |
| 5,916,385 A | * | 6/1999 | Coats | |
| 5,927,920 A | * | 7/1999 | Swanstrom | |

FOREIGN PATENT DOCUMENTS

| | | |
|---|---|---|
| EP | 0645153 A1 | 3/1995 |
| EP | 0703372 B1 | 3/1996 |
| TW | 18436 | 2/1975 |
| TW | 331380 | 5/1998 |

OTHER PUBLICATIONS

Morgan–Grampian Ltd., "Mechanical Fasteners for Aluminium," *Design Engineering*, Oct. 1, 1993.

* cited by examiner

*Primary Examiner*—Flemming Saether
(74) *Attorney, Agent, or Firm*—Seed IP Law Group PLLC

(57) ABSTRACT

A screw connection, which is intended in particular for plastic members comprises a screw and an insert member which is to be nonrotatably fitted into one of the components involved in the connection and which receives the screwthread of the screw in an axial passage. In accordance with the invention the axial passage of the insert member is of a smooth-walled, that is to say screwthread-free, configuration and the screw has a screwthread, which cuts or grooves the female screwthread of the insert member. The screw, like the insert, can comprise an aluminum alloy, in which case however the alloy of the screw is of a substantially greater hardness than that of the insert member.

20 Claims, 2 Drawing Sheets

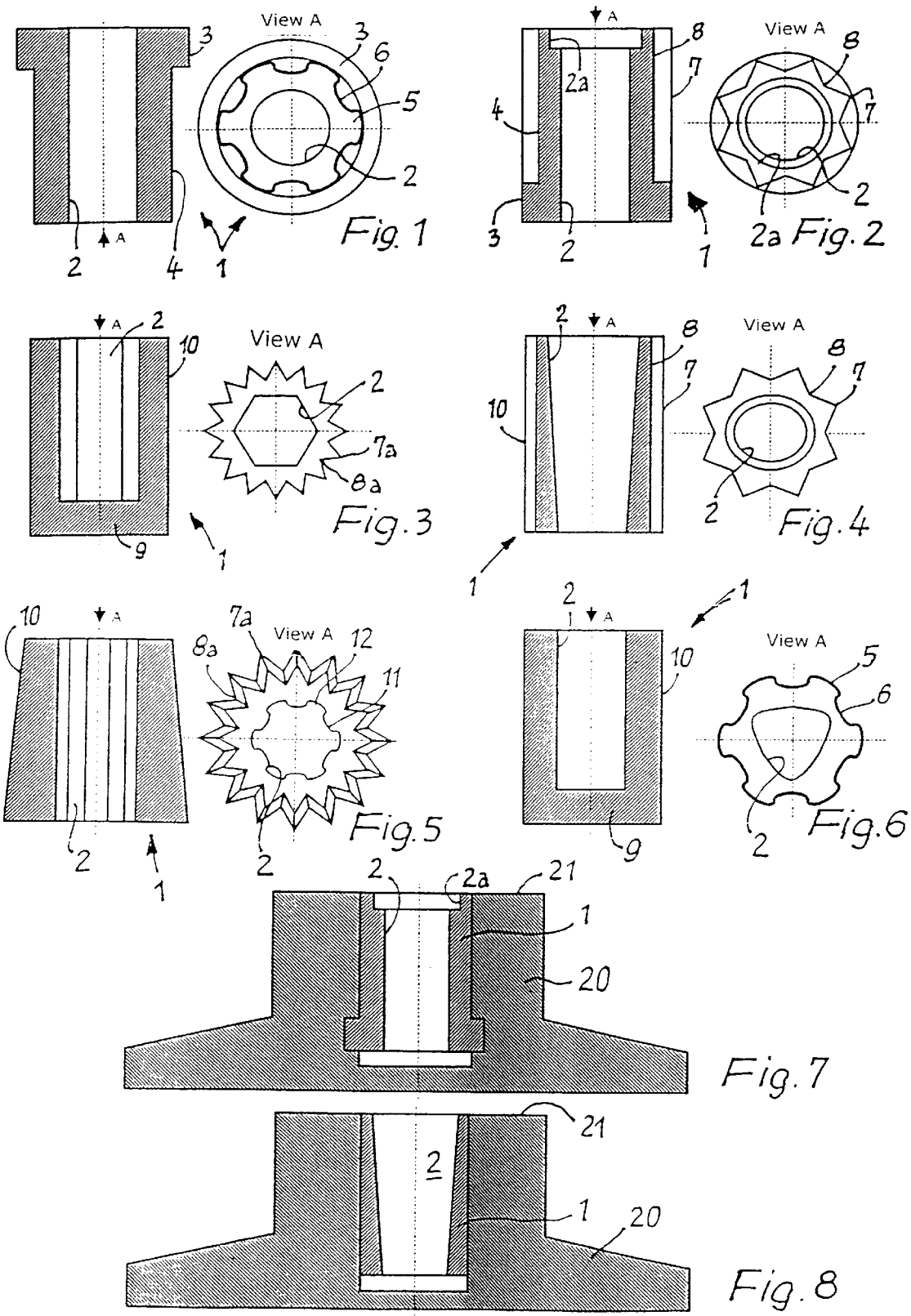

SCREW CONNECTION

BACKGROUND OF THE INVENTION

1. Field of the Invention

Figure 9:
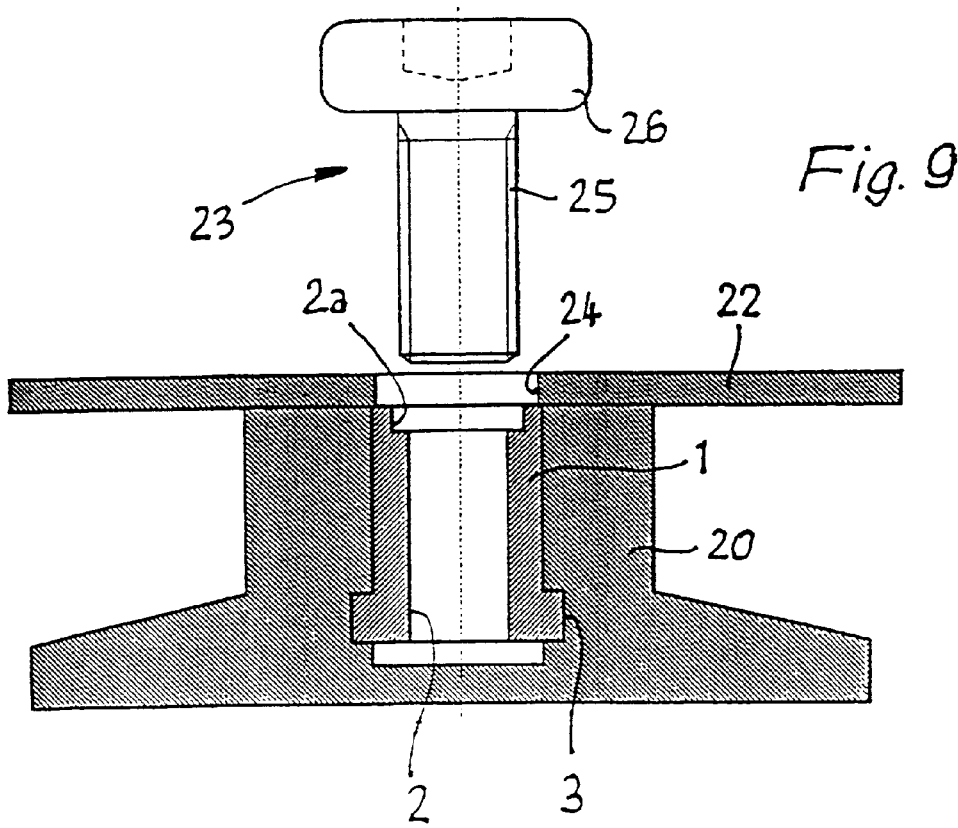

The invention concerns a screw connection, in particular for plastic members, comprising a screw and an insert member, which is to be non-rotatably fitted into one of the components involved in the connection and which receives the screwthread of the screw in an axial passage.

2. Description of the Related Art

Screw connections of that kind are known, in the form of so-called micro-screw arrangements for small and more specifically thin-walled plastic members. Because these connections are frequently not capable of withstanding the forces which occur when screwing in the co-operating screwthread of self-tapping screws, the state of the art involves using insert members which, in the operation of injection molding of the plastic component, have plastic material injected therearound (referred to as inlays), or which are subsequently embedded hot into the (thermoplastic) plastic member or by means of ultrasound (referred to as inserts). These known insert members comprise brass and are produced in the form of turned components with a female screwthread in the passage and an outer knurling or the like for the purposes of increasing their resistance to rotation in the embedded condition. A metric steel screw is used as the screw. This known screw connection not only requires relatively high manufacturing costs but it is also high in weight, which is undesirable in many situations of use, for example in the case of mobile telephones. Furthermore the necessary tolerances of pre-cut screwthreads reduce the security of the screw connection against coming loose of its own accord, in particular when dynamic loadings are involved; in addition to this, there is also the loss of prestressing force as a result of fluctuating temperatures because of the different coefficients of thermal expansion of the materials involved.

BRIEF DESCRIPTION OF THE SEVERAL VIEWS OF THE DRAWING(S)

Figure 10:
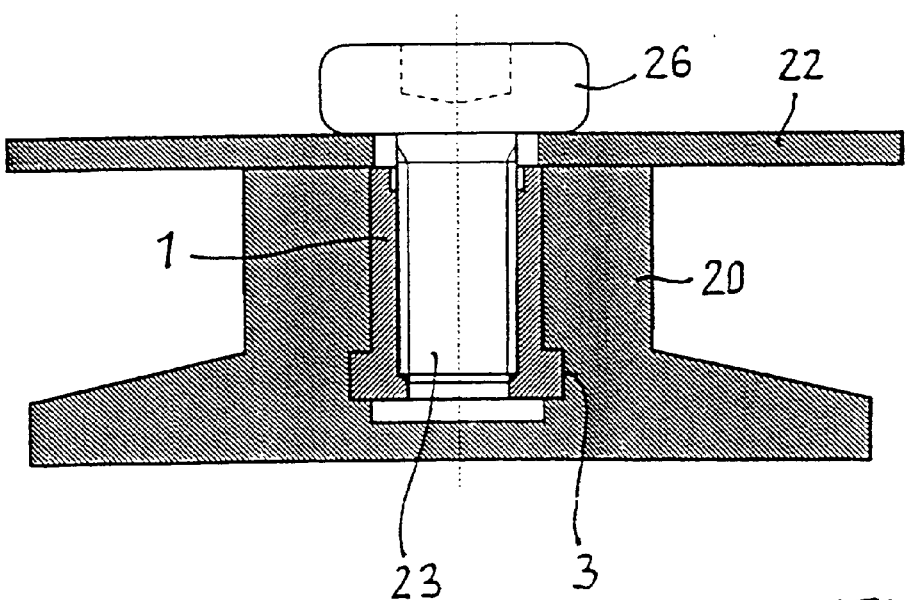

The drawing illustrates the invention by means of an embodiment. In the drawing:

FIGS. 1 to 6 show various forms of the insert member in cross-section and the respective view A;

FIGS. 7 and 8 show the insert members of FIGS. 2 and 4 in the installed condition; and FIGS. 9 and 10 show fixing of a flat profile member to a component before and after a screw is screwed into the insert member.

BRIEF SUMMARY OF THE INVENTION

Aspects include a screw connection for plastic members. Aspects further include a screw and an insert member, which is to be non-rotatably fitted into one of the components involved in the connection and which receives the screwthread of the screw in an axial passage. Aspects further include the insert member being an aluminum alloy. Aspects further include an axial passage of the insert member being of a smooth-walled (screwthread-free) configuration. Aspects further include the screw being an aluminum alloy of a substantially greater hardness than the alloy of the insert member. Aspects further include the screw having a screwthread which cuts or grooves the female screwthread of the insert member.

For a better understanding of the present invention, preferred embodiments thereof are now described, purely to provide non-limiting examples, with reference to the attached drawings, wherein:

DETAILED DESCRIPTION OF THE INVENTION

The object of the present invention, more specifically for purposes of use of the kind referred to hereinbefore, is to provide a screw connection, which is cheaper to produce and at the same time operationally reliable and secure.

Based on the state of the art set forth in the opening part of this specification, the invention provides that the axial passage of the insert member is of a smooth-wall (screwthread-free) configuration and the screw has a screwthread which is self-cutting or self-grooving for the female screwthread of the insert member. Such an insert member is simpler and cheaper to produce than a turned component, more specifically for example by extrusion, but on the other hand it is capable of withstanding the forces which occur when the female screwthread is being grooved or cut in the passage by means of the appropriately designed screw, without the plastic component which receives the insert member suffering damage.

This also constitutes the particularity of the present use of such screws, which are extensively known per se and which, by virtue of their appropriate configuration, themselves cut or groove the counterpart screwthread in the other component involved in the connection. Hitherto, such screws were used only where there was no need for a specific additional counterpart component involved in the connection, but the screw is screwed directly (after a pilot bore has been formed) into the component to be secured or a component holding same.

The diameter of the screwthread-free passage does not have to remain the same over the axial length thereof, but can decrease from one end to the other. It is also possible for the passage to be of a cross-sectional shape which differs from a circle, for example it may be of an elliptical cross-section or a round cross-section with projections which extend in the form of ribs in parallel relationship to the axis along the wall of the passage so that the screwthread produced in the inset is limited to those ribs, but the operation of forming the screwthread is made easier.

It has proven to be advantageous from the point of view of the engineering procedures involved in manufacture and use for the insert member to be made from aluminum, while a particular advantage which is not limited to the present situation of use is enjoyed if the screw also comprises an aluminum alloy of substantially greater hardness than that of the insert member. Preferred for the insert member is an aluminum alloy which cannot be age-hardened or which is naturally hard or which can be age-hardened in the cold condition, of a hardness<90 HB, while the screw is made from an aluminum alloy which can be age-hardened in the hot condition, of a hardness>140 HB. If tensile strength Rm is taken as the criterion, then that of the screw should be>450 Mpa (N/mm$^2$), while Rm<300 N/mm$^2$ should be observed for the insert member. In particular an AlMg-alloy or an AlMgSi-alloy falls to be considered for the insert member, and an AlZnMgCu-alloy is considered for the screw.

Besides the saving in weight in relation to the above-described conventional pairing by a factor of 3 and besides a highly effective self-locking action in respect of the screwthread combination by virtue of the play-free co-operation of the screw and the insert member, the aluminum pairing affords the additional advantage of a low level of losses in respect of prestressing force, in the event of a fluctuating thermal load, because the coefficients of thermal expansion of the components involved in the connection are similar; in addition, these involve antimagnetic connection components.

The insert member which is shown in FIG. 1 and which is generally identified by reference numeral 1 has a passage 2, which is cylindrical, that is to say circular in cross-section. Provided on its outside, at one end thereof, is a cylindrical collar 3 while over the remainder of its length, that is to say in the region 4, its outside contour has in cross-section an external hexagonal-round profile with ribs 5 and grooves 6.

The insert member 1 shown in FIG. 2 also has a cylindrical passage 2 which at one end however is enlarged over a short part of its length to form a recess 2a. Provided on the outside at the other end is a cylindrical portion 3 while formed in the region 4 is a multi-tooth profile with points 7 and troughs 8.

The passage 2 of the insert member 1 shown in FIG. 3 is closed at its one end by an end portion 9 so that the passage 2 is in the form of a blind hole. The blind hole is hexagonal in cross-section and in its cross-section the outside surface 10 of the insert member 1 is shaped to afford a multi-tooth profile with points 7a and troughs 8a.

In the case of the insert member 1 shown in FIG. 4, the passage 2 is elliptical in cross-section and tapers from one end to the other, in the screwing-in direction. On the outside, the transverse dimension remains the same over the length of the insert member and is shaped to afford a multi-tooth profile with points 7 and troughs 8.

The insert member 1 shown in FIG. 5 has a passage 2, which in cross-section involves a contour in the configuration of a rounded hexagon, with ribs 11 and grooves 12. The transverse dimension of the passage 2 is the same over the length of the insert member 1 while its outside surface 10—in the screwing-in direction—is enlarged from one end to the other and is in the form of a multi-tooth profile with points 7a and troughs 8a.

The transverse dimensions of the insert member 1 shown in FIG. 6 remain the same over its length, but its passage 2 is closed at one end by an end portion 9. Moreover the passage 2 is of a trilobal cross-section while the outside contour 10 is in the form of a rounded outside hexagon profile with ribs 5 and grooves 6.

FIG. 7 shows the insert member of FIG. 2 in the condition of being installed in a component 20, more specifically in such a way that the end of the insert member 1, which is provided with the recess 2a, terminates flush with the surface 21 of the component 20.

FIG. 8 shows a similar condition of installation for the insert member 1 shown in FIG. 4, more specifically in such a way that the end of the insert member with the larger diameter of the passage 2 terminates flush with the surface 21 of the component 20.

FIGS. 9 and 10 show the fixing of a flat profile member 22 to the component 20 by means of the insert member 1, which is fixed therein, and a screw 23. When the screw 23 is screwed into the insert member 1 through the hole 24, it cuts or channels in the passage 2 in the insert member 1 a screwthread which corresponds to the screwthread 25 of the screw 23, and finally with its head 26 clamps the flat profile member 22 fast on the component 20.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A screw connection for plastic members, the screw connection comprising:
   a screw having a screwthread so dimensioned to cut or groove complimentary screwthreads and being of an aluminum alloy having a first hardness; and
   an insert member of an aluminum alloy of a second hardness substantially less than the first hardness and so shaped to be non-rotatably fitted into one of the plastic members, the insert member having an axial passage with a smooth-walled configuration to receive the complimentary screwthread of the screw.

2. The screw connection according to claim 1 characterized in that the insert member comprises a naturally hard or cold age-hardenable aluminum alloy of a hardness less than 90 HB and the screw comprises a hot age-hardenable aluminum alloy of a hardness greater than 140 HB.

3. The screw connection according to claim 1 characterized in that the insert member comprises an AlMg— or AlMgSi-alloy and the screw comprises an AlZnMgCu-alloy.

4. The screw connection according to claim 1 characterized in that the cross-section of the axial passage is of a non-round configuration.

5. The screw connection according to claim 1 characterized in that the cross-section of the axial passage decreases in the longitudinal direction.

6. The screw connection according to claim 1 characterized in that the outside cross-section of the insert member has axially extending radial projections.

7. The screw connection according to claim 1 characterized in that the outside cross-section of the insert member enlarges in the longitudinal direction.

8. The screw connection according to claim 1 characterized in that the insert member is an extrusion workpiece.

9. A glueless screw connection for plastic members, the screw connection comprising:
   a screw formed of an aluminum alloy having a first hardness, and having a screwthread so dimensioned to cut or groove complimentary screwthreads; and
   an insert formed of an aluminum alloy of a second hardness, substantially less than the first hardness, and so shaped to be non-rotatably fitted into one of the plastic members, the insert having an axial passage having a longitudinal dimension and having a smooth-walled configuration to receive the complimentary screwthread of the screw and to secure the insert in the plastic member without need of gluing, by expansion of the insert as the screw is initially screwed into the insert along the longitudinal dimension.

10. The screw connection of claim 9 wherein the axial passage has a cross-section perpendicular to the longitudinal dimension and the cross-section of the axial passage is of a non-round configuration.

11. The screw connection of 9 wherein the axial passage has cross-section perpendicular to the longitudinal dimension, and an entrance for insertion of the screw, and the cross-section of the axial passage decreases with position along the longitudinal direction from the entrance.

12. The screw connection of claim 9 wherein the insert has an outer surface having axially extending radial projections.

13. The screw connection of claim 9 wherein the insert has an entrance for insertion of the screw and an external diameter that increases with position along the longitudinal direction from the entrance.

14. The screw connection of claim 9 wherein the insert is an extrusion workpiece.

15. The screw connection of claim 9 wherein the insert comprises a naturally hard or cold age-hardenable to aluminum alloy of a hardness less than 90 HB in the screw comprises a hot age-hardenable aluminum alloy of a hardness greater than 140 HB.

16. The screw connection of claim 15 wherein the insert comprises an aluminum-magnesium or aluminum-magnesium-silicon alloy and screw comprises an aluminum-zinc-magnesium-copper alloy.

17. A fastener, comprising:
an insert formed of an aluminum alloy having a first hardness and shaped to be non-rotatably fitted into a plastic substrate;
an axial passage formed in the insert with smooth walls, longitudinally, and configured to receive a screw formed of an aluminum alloy of a second hardness, substantially greater than the first hardness, the passage further configured to be tapped by the screw upon introduction of the screw into the axial passage.

18. The fastener of claim 17 wherein the axial passage is cylindrical and smooth, laterally.

19. The fastener of claim 17 wherein the axial passage is longitudinally ribbed.

20. The fastener of claim 17 wherein the axial passage is oval in a cross section taken perpendicular to the longitudinal axis.

* * * * *